United States Patent
Basso

(10) Patent No.: US 8,191,283 B2
(45) Date of Patent: Jun. 5, 2012

(54) INSOLE

(76) Inventor: Angelo Basso, Motebelluna (IT)

( * ) Notice: Subject to any disclaimer, the term of this patent is extended or adjusted under 35 U.S.C. 154(b) by 421 days.

(21) Appl. No.: 12/447,794

(22) PCT Filed: Jul. 3, 2007

(86) PCT No.: PCT/IT2007/000475
§ 371 (c)(1),
(2), (4) Date: Apr. 29, 2009

(87) PCT Pub. No.: WO2009/004656
PCT Pub. Date: Jan. 8, 2009

(65) Prior Publication Data
US 2010/0071234 A1    Mar. 25, 2010

(51) Int. Cl.
*A43B 13/38* (2006.01)
*A43B 7/08* (2006.01)

(52) U.S. Cl. .................... 36/3 B; 36/43; 36/141

(58) Field of Classification Search ............ 36/3 B, 36/43, 44, 71, 141, 140, 147
See application file for complete search history.

(56) References Cited

U.S. PATENT DOCUMENTS

| | | | |
|---|---|---|---|
| 895,950 A * | 8/1908 | Von Bracht | 36/3 B |
| 2,090,881 A * | 8/1937 | Wilson | 36/29 |
| 4,118,878 A * | 10/1978 | Semon | 36/59 C |
| 5,331,750 A | 7/1994 | Sasaki et al. | |
| 5,799,413 A * | 9/1998 | Argyris | 36/43 |
| 6,209,226 B1 * | 4/2001 | Squadroni | 36/3 B |
| 6,305,100 B1 | 10/2001 | Komarnycky et al. | |
| 7,250,033 B2 * | 7/2007 | Beiruti | 601/134 |
| 7,712,229 B2 * | 5/2010 | Yang | 36/3 B |
| 7,721,446 B2 * | 5/2010 | Royle | 30/49 |
| 7,850,628 B2 * | 12/2010 | Beiruti | 601/134 |

FOREIGN PATENT DOCUMENTS

| | | |
|---|---|---|
| BE | 504153 | 10/1952 |
| DE | 29907839 | 9/2000 |
| EP | 0674856 A | 10/1995 |
| FR | 2 397 801 | 2/1979 |
| GB | 2250417 | 6/1992 |
| IT | 2004U000017 | 4/2004 |

OTHER PUBLICATIONS

International Search Report dated Mar. 14, 2008 from the corresponding PCT/IT2007/000475.

* cited by examiner

*Primary Examiner* — Jila Mohandesi
(74) *Attorney, Agent, or Firm* — Katten Muchin Rosenman LLP

(57) ABSTRACT

An insole or footbed for footwear includes a flat support element from which mushroom-shaped formations extend. Air circulation channels are formed between said formations. The insole ensures good foot ventilation.

12 Claims, 2 Drawing Sheets

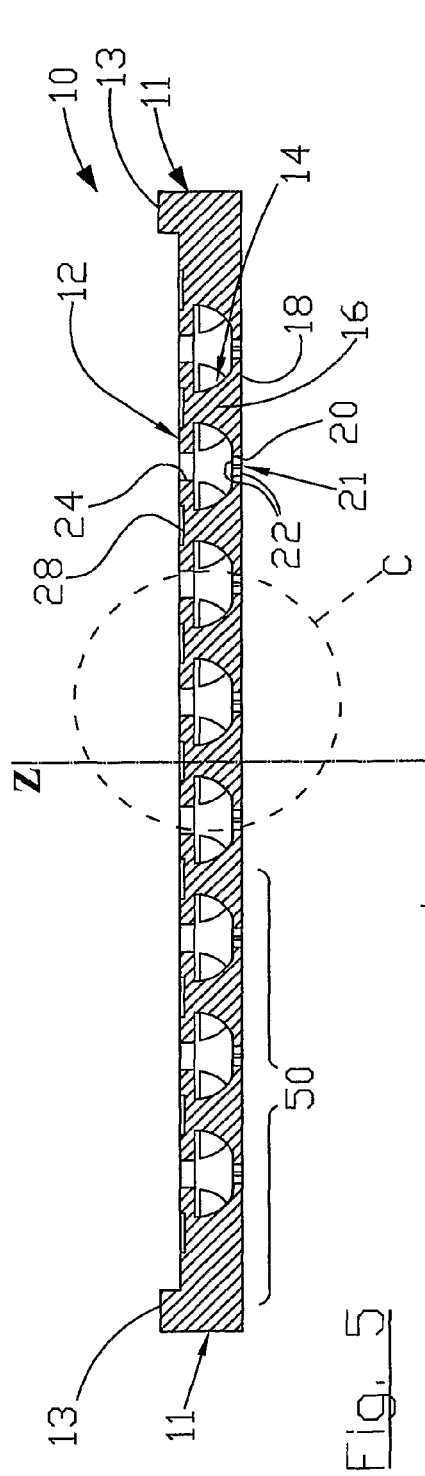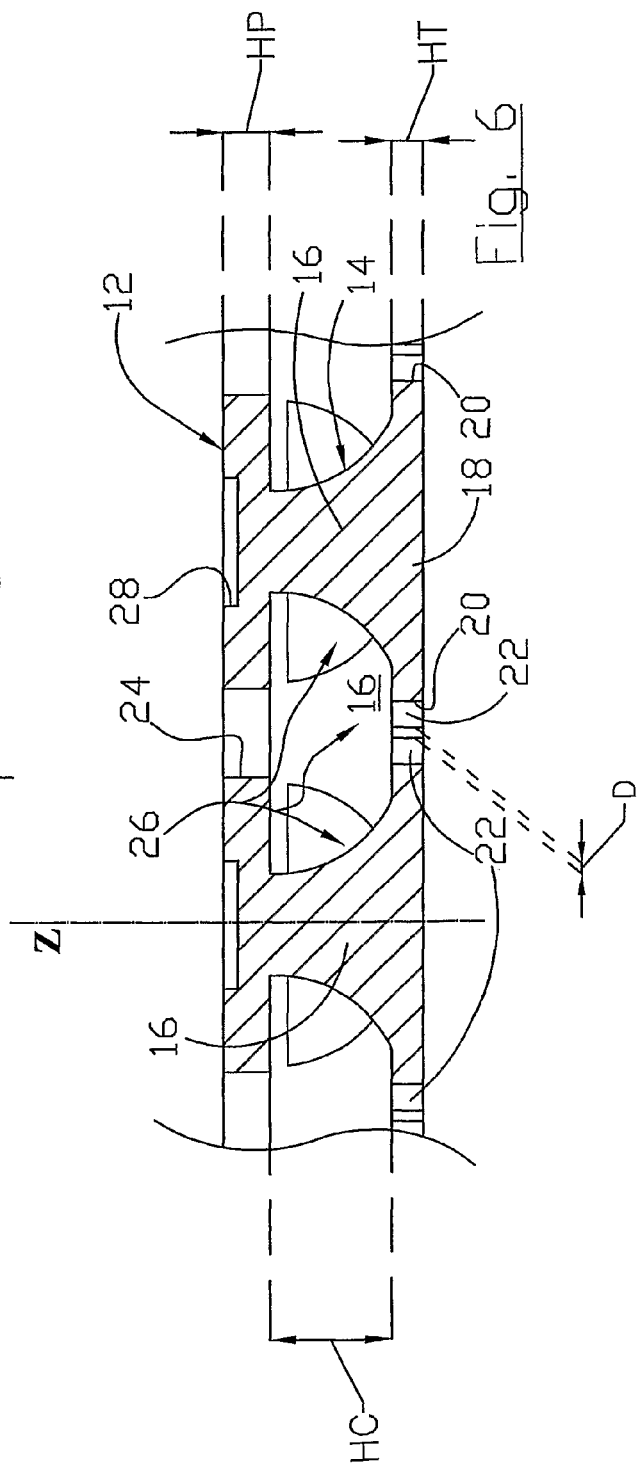

INSOLE

BACKGROUND OF THE INVENTION

1. Field of the Invention

The present invention relates to footwear insoles or footbeds.

2. Description of the Related Art

Insoles for footwear, in particular for sports footwear, inserted between the tread sole and the inner insole in contact with the foot, are commonly known today. These insoles act to improve foot ventilation and to absorb shock during movement.

The patent for the utility model n. TV2004U000017 by the same Applicant describes an insole composed of two layers of a thermoplastic elastomer (SEBS). The lower layer has lengthwise ribbing in relief that supports the second layer, composed of a mesh of strips arranged at right angles. At regular intervals where the strips cross each other there is a through hole that passes through the second layer. When placed together the two layers form longitudinal channels in the area between the layers.

An insole with this configuration ensures good ventilation inside the footwear, but only in the direction of the longitudinal channels.

Another insole is described in GB 2 250 417. This is composed of a perforated upper layer and a lower layer with grooves arranged at right angles to each other. The air can be expelled along the grooves; however, these have limited efficiency because of the fact that most grooves are only longitudinal. The number of grooves cannot be increased, as this will eliminate the correct support points for the upper layer.

U.S. Pat. No. 6,305,100 proposes another insole having a central cavity and lateral ventilation ports. Air recirculation is limited, especially along the edges, by the volume occupied by the insole.

The principle object of the invention is to provide a different insole able to offer good ventilation qualities.

SUMMARY OF THE INVENTION

These and other objects are achieved by a footwear insole characterised in that it comprises a flat support element from which mushroom-shaped formations extend.

Empty spaces are therefore created between the flat support element and the mushroom formations, and, in addition to making the insole lighter in weight, these also form air channels as well as create an insulating cushion. Any perspiration produced can thus be collected by and in said channels and then expelled from the insole through natural action or by the pumping effect obtained when the said insole is flexible, i.e. by making it from rubber or plastic materials, preferably SEBS, SEEBS or EBS.

Preferably a mushroom formation comprises a stem which is tapered towards the flat element and is integral thereto. A head is attached to the end of the stem, preferably having a width greater than the stem's and/or being flat. This configuration optimises the ratio between the solid and empty volumes inside the insole and facilitates the passage of the air through the channels considerably, especially when the said stem is frustoconical in shape and has a concave profile.

A preferred embodiment provides that the head of the formation has a substantially regular parallelepiped shape, of lower height than the base dimensions; in practice it is a thin plate.

Preferably the heads of the formations are arranged so that all together they form a support surface and define void spaces between the support surface and the flat element. Thanks to the flat configuration, the insole can be easily inserted into a footwear.

In order to increase the air convection and transport, also in orthogonal directions to the support surface, the base (or plant) of the head has a short side containing a recess so as to form an opening between two adjacent heads which communicates with the empty spaces inside the insole and through which the air in the channels can exit or circulate.

Preferably the formations are arranged in parallel rows for easier production and better appearance. Advantageously the rows will be arranged so that the components in one row are offset in relation to those of the adjacent row, in order to increase the section of the channels formed between the tapered stems. Efficient layout is obtained if each formation in a row is aligned, along an orthogonal direction to the row it belongs to, with a corresponding formation of a non adjacent row, for example the row just following the immediately adjacent row. In this case, therefore, the channels slant at an angle between 30°-70° in relation to the row of formations and have a periodic structure along the surface of the insole.

In order to increase the breathing capacity of the insole even further, the support surface can include through-holes carried out between the stems of two adjacent formations. The channels between the components, therefore, provide a further exit for the air.

The support surface can also comprise lightening recesses on the surface opposite the formations.

BRIEF DESCRIPTION OF THE DRAWINGS

The aspects and advantages of the present invention will be made more apparent from the following description provided simply as an example, with reference to the appended drawing wherein:

FIG. 5 shows a section view of the insole according to plane V-V in FIG. 1;

FIG. 6 shows an enlarged view of the detail shown in FIG. 5 referenced by C.

DETAILED DESCRIPTION OF THE INVENTION

Figure 1:
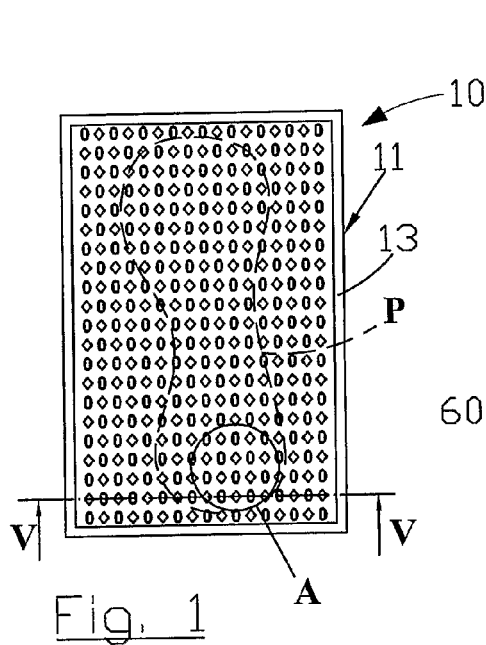
FIG. 1 shows a top view of an insole according to the invention.

In all figures the numeral 10 identifies an insole structure comprising a flat support element (or surface or layer) 12 from which identical formations (or structures) 14 having a mushroom shape extend orthogonally (along a Z axis) the formations 14 are composed of a stem 16 (see FIG. 6) which tapers towards the flat element 12 and which bears a flat head 18 on its free end. The stems 16 have the same length and the heads 18 are coplanar, therefore they form a support surface, indicated by 50 in FIG. 5.

Given the periodicity of the structure, only a few elements are shown for the sake of simplicity. As FIGS. 5 and 6 show, the stem 14 is substantially frustoconical in shape, with the minor base integral to the flat element 12, and has a concave and curved profile (in section).

The head 18 has a substantially regular parallelepiped form, of height HT lower than the dimensions of the base, which has sides of measure L1 and L2.

Figure 4:
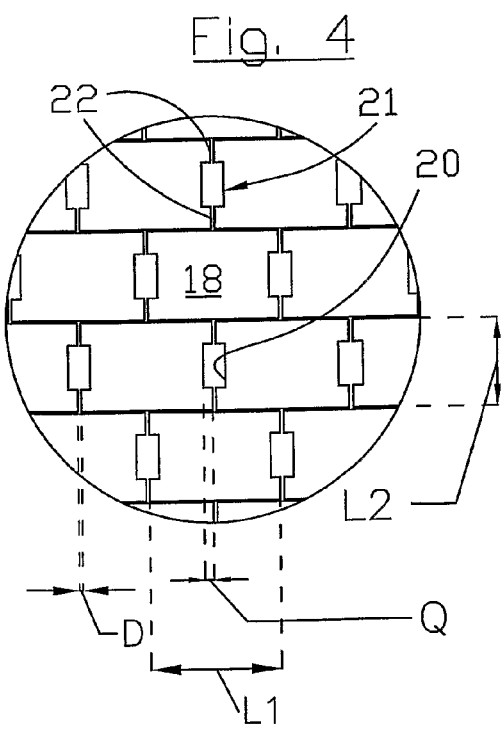
FIG. 4 shows an enlarged view of the detail shown in FIG. 3 referenced by B.

The preferable values are: 0.5 mm<HT<2 mm; 5 mm<L1<10 mm; 4 mm<L2<8 mm. The plan of the head 18 has a basically rectangular shape. The head 18 has a recess 20 on each of the short sides (in this manner the resulting plan resembles an "H") so that two small protruding teeth 22 on each short side are formed. The recess 20 preferably has a depth Q between 0.5 and 2 mm, so as to define an opening 21 with an about double width between two heads 18 (see FIG. 4). The ends of the teeth 22 are the part of a head 18 closest with respect to a head 18 in the same row. The distance D between the teeth 22 of two heads 18 is approximately 0.2-1 mm.

As FIGS. 1 to 4 show, the formations 14 are arranged aligned in parallel rows (X direction). Each row is arranged so that the respective formations 14 are offset in relation to those in other rows. In particular the formations 14 of one row are arranged aligned two by two also along a Y direction orthogonal to the rows (arranged in the X direction). Thus also each head 18 in one row has along the Y direction a corresponding head in another row (in the same position along the X direction) one row out of two.

Figure 2:
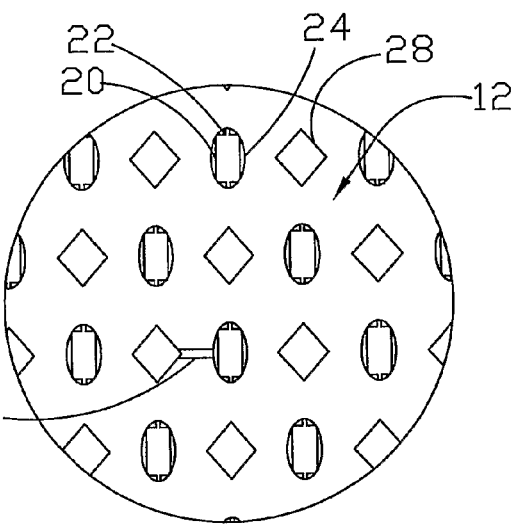
FIG. 2 shows an enlarged view of the detail shown in FIG. 1 referenced by A.
Figure 3:
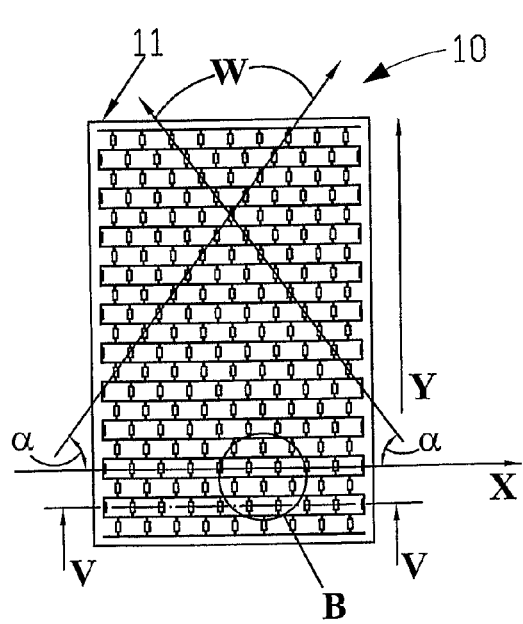
FIG. 3 shows a bottom view of the insole shown in FIG. 1.

FIGS. 1 and 2 show that the flat element 12 includes through-holes 24, having an oval or circular shape, obtained in the middle of two adjacent formations 14. In other words, a hole 24 opens into the interior of the insole 10, that is the space limited by the flat element 12 and the heads 18, in an empty space 26 surrounded by four tapered bodies 16. Said space 26 communicates with identical adjacent spaces thanks to the cavities formed around the tapered bodies 16, and therefore, throughout, the interior of the insole 10 happens to be run by a regular net of channels that extend along directrixes W angled by an angle $\alpha$ relation to the X direction. According to the relative size and arrangement of the components described, $\alpha$ can vary between 30° and 70°. FIG. 3 shows two directrixes W pertaining to two channels that cross one another.

The element 12 comprises a peripheral rim 11 to which the last heads 18 of each row are integral. Horizontal through-holes can be created in the rim 11 to communicate with the internal channels. This considerably improves the evacuation of the air from insole 10. A peripheral raised ridge 13 is created around the rim 11.

The insole 10 can be cut/shaped to assume the shape of the sole of a foot (see dashed line P in FIG. 1) or can be formed directly having the form as shown by P, but without enclosing edges. In this case all the internal channels open onto the lateral surface of the insole, since its lower part would be composed of mushroom-shaped formations only.

On its surface opposite the formations 14, the flat element 12 has lightening recesses 28 (here of rhomb shape) as well as micro-grooves 60 (with a width between 0.2 and 1 mm, and a depth between 0.4 and 2 mm, for example) between the edge of a hole 24 and a recess 28. The micro-grooves 60 improve the air circulation inside the insole 10.

It is apparent that on the whole the invention achieves the aim of improved air circulation. The capacity of the channel net under the foot to transport air and perspiration along the channels and away from the foot is increased and improved through the openings 21.

Another important advantage is the fact that the channels formed by the formations 14 provide an insulating air cushion throughout. The empty space between the element 12 and the heads 18 turns out as an extremely efficient thermal insulation which insulates the foot laid on the element 12 from the heat coming from the ground (especially in sports footwear or those used for extremely tough activities).

The insole 10 is advantageously conceived to be produced by moulding in a single piece. Other variants can be created, for example, by changing the shape of the stem (tapered or not, triangular, pyramid shaped, etc), the shape of the head (spherical, globular, egg-shaped, etc) as well as the size of the elements. These variations can form a different structure for the internal channels of the insole to adapt them to a particular footwear.

The invention claimed is:

1. An insole or footbed comprising:
    a support element and a plurality of formations extending the support element, the support element and the plurality of formation being integral with each other,
    each formation comprising a stem and a head, the stem and the head being integral with each other, the stem tapering from a first portion adjacent to the support element to a second portion adjacent to the head, the second portion being wider in cross-section than the first portion, the head having a larger width in cross-section than the second portion of the stem;
    an overall support surface, each head of the plurality of formations defining a portion of the overall support surface;
    a plurality of empty spaces, each empty space disposed between the support surface and the support element and between the stems of two adjacent formations; and
    a plurality of through-holes disposed in the support element, each through-hole connecting directly to a respective empty space of the plurality of empty spaces;
    wherein the plurality of formations are arranged in parallel rows;
    wherein the rows are arranged in such a manner that a plurality of formations of one row are offset in relation to a plurality of formations of another row.

2. Insole or footbed according to claim 1, wherein the head has a substantially regular parallelepiped shape of a lower height than a base dimension.

3. Insole or footbed according to claim 2, wherein the head has a short side comprising a recess, in order to form an opening between two adjacent heads, the opening communicating with the respective empty space of the plurality of empty spaces.

4. Insole or footbed according to claim 1, wherein each formation of a row is aligned, along a direction orthogonal to the same row, with a corresponding formation of a non-adjacent row.

5. Insole or footbed according to claim 1, and the support element comprises a lightening notch made in a surface comprised of the support elements.

6. Insole or footbed according to claim 5, further comprising a micro-groove between an edge of one respective through-hole and the lightening notch.

7. The insole or footbed of claim 1, wherein the support element is flat.

8. The insole or footbed of claim 1, wherein the respective empty space comprises a first portion proximal to the support element and a second portion proximal to the head, the first portion being wider than the second portion.

9. The insole of footbed of claim 3, wherein air can be evacuated via a path comprising one of the through-holes to the respective empty space and to the respective opening.

10. An insole or footbed comprising:
    a support element and a plurality of formations extending the support element, the support element and the plurality of formation being integral with each other,
    each formation comprising a stem and a head, the support element and the plurality of formation being integral with each other, the stem tapering from a first portion adjacent to the support element to a second portion adjacent to the head, the second portion being wider in cross-section than the first portion, the head having a larger width in cross-section than the second portion of the stem;

an overall support surface, each head of the plurality of formations defining a portion of the overall support surface;

a plurality of empty spaces, each empty space disposed between the support surface and the support element and between the stems of two adjacent formations; and a plurality of through-holes disposed in the support element, each through-hole connecting directly to a respective empty space of the plurality of empty spaces;

wherein the plurality of formations are arranged in parallel rows;

wherein each formation of a row is aligned, along a direction orthogonal to the same row, with a corresponding formation of a non-adjacent row.

11. The insole or footbed of claim 10, wherein an exterior surface of the support element and the overall support surface define opposed surfaces.

12. The insole or footbed of claim 10, wherein the support element is flat.

* * * * *